April 16, 1963  J. LARBRE  3,085,559
DOUBLE INJECTION DEVICE FOR INTERNAL COMBUSTION ENGINES
Filed March 6, 1961

INVENTOR
JEAN LARBRE
BY Toulmin & Toulmin
ATTORNEYS

April 16, 1963  J. LARBRE  3,085,559
DOUBLE INJECTION DEVICE FOR INTERNAL COMBUSTION ENGINES
Filed March 6, 1961  2 Sheets-Sheet 2

INVENTOR
JEAN LARBRE
BY Toulmin & Toulmin
ATTORNEYS

Patented Apr. 16, 1963

3,085,559
DOUBLE INJECTION DEVICE FOR INTERNAL COMBUSTION ENGINES
Jean Larbre, Colombes, Seine, France, assignor to Institut Francais du Petrole, des Carburants et Lubrifiants, Rueil-Malmaison, Seine et Oise, France
Filed Mar. 6, 1961, Ser. No. 108,968
Claims priority, application France Mar. 8, 1960
6 Claims. (Cl. 123—139)

The present invention relates to a new and simple device for carrying out improvements in the operation of internal combustion engines of the compression ignition type and particularly for operating such engines by means of a double-injection method.

It has already been established in a preceding patent application, Serial No. 735,479 filed May 15, 1958, now Patent 2,960,079, issued Nov. 15, 1960, assigned to the same assignee as the present application, that considerable advantages, such as a smoother combustion regardless of the type of fuel employed and an increased power output at a given rate of pressure increase, are obtained by a new method of double-injection. According to this method a first, "carburating" fraction of the fuel charge is injected into the hot residual gases remaining in the combustion space of the cylinder toward the end of the exhaust stroke of a work cycle and a second, "igniting" injection of the remainder of the fuel charge takes place toward the end of the compression stroke of the next work cycle.

Such conditions are fulfilled, for instance, if the timing of the first "carburating" fraction and that of the main "igniting" injection are chosen in such a way that the interval between these two successive injections into the same cylinder corresponds to one complete revolution (360°) of the crankshaft.

Various feeding devices may be used for carrying out the double-injection method. For instance, two injection pumps, each having the same number of cylinders as the engine, can be employed for adjusting at will, and as a function of the type of fuel used, the ratio of fuel amounts introduced, respectively, by the first, "carburating" injection and the second, "igniting" injection.

While this arrangement, as described in the copending application, supra, is effective, it suffers from the drawback of being too expensive and of requiring important and complicated changes in the engine structure, due to the use of two pumps instead of only one pump.

Another apparatus used for operating a motor according to the new double-injection method, and described in the co-pending application, supra, consists in providing an appropriate camshaft for a single injection pump, whereby the phase angle between the two successive injections for the same cylinder is determined. However, according to that solution the ratio in the amounts of fuel injected as a first, "carburating" portion and a second, "igniting" portion cannot be adjusted in a particular engine to different types of fuel for operating the engine.

Still another arrangement, which is described in a copending patent application, Serial No. 856,831, filed December 2, 1959, now Patent 3,014,466, issued December 26, 1961, assigned to the same assignee as the present application, provides more simple means for carrying out the double-injection method with the known engines without requiring substantial modification of the latter.

However, according to this latter arrangement the two portions of the total fuel supply which are supplied to each cylinder during any work cycle are kept in the same ratio to one another whatever may be the changes in the amount of the fuel supply according to the selected operating conditions (percent of the full charge, running speed).

This is inconvenient in the case where it is desired to operate according to the double-injection method with relatively low amounts of the total fuel supply per working cycle since it may occur at a reduced speed that the amount of fuel delivered by the system for the first "carburating" portion is insufficient for actuating the nozzle, the engine being therefore operated according to the single-injection method at such low speeds.

These disadvantages are overcome by the new and useful device according to the present invention which permits the carrying out of the double-injection method with the known engines without requiring any substantial modification of the latter and to vary the respective amount of the first "carburating" fraction and the second "igniting" fraction at will without necessarily maintaining the same ratio between said two fractions of the total fuel supply when the operating conditions of the engine are varied.

It is therefore an object of this invention to provide a simple apparatus by which a first "carburating" portion of the fuel charge is injected into the residual hot gases remaining in the combustion space of the cylinder toward the end of the exhaust stroke of a work cycle and the remainder of the fuel charge is injected toward the end of the compression stroke of the next work cycle.

It is another object of this invention to provide a simple apparatus for carrying out said two successive injections into the same cylinder during each working cycle so that the time interval between said two injections is that corresponding to a full revolution of the crankshaft, i.e. 360° in the case of a four stroke engine.

It is a further object of this invention to provide means for adjusting at will in accordance with the kind of fuel used the respective amounts of the two successive portions of the fuel charge to be supplied to the same cylinder and thereby to obtain the highest efficiency of the double-injection method in conjunction with the use of each kind of fuel.

It is still a further object of this invention to provide means for securing, if desired, injection of a minimum fuel amount in a first "carburating" injection whatever may be the speed of the engine.

It is yet another object of this invention to provide means for varying the amount of the first "carburating" portion so that a part of the same is kept substantially constant whatever may be the total fuel supply and the remaining part is proportional to the latter.

All these and other objects and advantages are achieved by the present invention which provides a very simple device permitting the operation of engines having an even number of feeding pipes, according to the double-injection method, with a time lag between the two injections corresponding to half a cycle, i.e. in the case of a four-stroke engine, to a complete revolution (360°) of the crankshaft and in the case of a two-stroke engine, to half a revolution (180°) of the crankshaft.

One of the greatest advantages of this invention results from its direct and simple adaptability to existing engines without any complicated structural changes of the latter.

It must be emphasized particularly that no special injection pump or camshaft is required for carrying out the double-injection method. The type of the pump used is not critical and the normal injection pump and camshaft as already used in the considered internal combustion engine of the compression-ignition type may still be employed according to this invention without any modification. Thus, injection pumps such as that of the usual type having the same number of cylinders as the engine, the rotary pumps, the pumps provided with rotary distributors or the pumps with one or more cylinders each supplying the fuel to a number of delivery pipes, for instance, by rotation of the piston, or any other pump of a conventional type are all adapted for carrying out two injections, in two different cylinders, of appropriate amounts of fuels, so that two successive injections are made per each cycle in each cylinder of the engine.

However, for the sake of brevity and in view of simplifying the following description, the latter will refer to the case of a pump of the usual type having the same number of cylinders as the engine and one delivery pipe connecting each of said cylinders to the corresponding one of the engine.

The double-injection method is carried out according to this invention by associating to each other by pairs each two delivery pipes of the pump which feed the injectors of the corresponding cylinders of the engine at an interval of a half-cycle relative to each other, i.e. at an interval of 180° relative to the rotation of the crankshaft in a two-stroke engine and of 360° in the case of a four-stroke engine (e.g., at the moment when the piston in the cylinder fed by one pipe of said pair is at the compression top dead center, the piston in the cylinder fed by the other pipe of said pair is at the exhaust top dead center).

The carrying-out of two successive injections per work cycle in each cylinder of the engine at such intervals corresponds to that of two simultaneous injections in said two cylinders wherein said pistons are at an interval of a half-cycle relative to each other.

According to this invention these two simultaneous injections of different fuel amounts ("carburating" and "igniting" fractions, respectively) are achieved by means of the same cylinder of the feed pump, which results in two simultaneous injections.

According to this invention the association by pairs of the delivery pipes of the pump is effected by means of an interconnected device comprising two chambers separated from each other by means of a moveable or flexible wall, each chamber freely communicating with that delivery pipe of said pair associated thereto. According to this arrangement the volume of each chamber may be varied without any change in the total volume of the two chambers, said variation resulting from the displacement or deformation of the separating wall.

Said interconnected device may be located at will so as to associate said delivery pipes to each other either at the portions thereof in the vicinity of the injection means in the cylinder of the engine or of the cylinders of the pump or at any intermediate portion of said pipes, these different locations of said device being equivalent for the carrying-out of the invention.

Due to this association of the pipes of the pump the amount of fuel delivered to any one of the latter is distributed in two parts, one for the main injection through the injector which is fed directly by that pipe and the other for increasing the volume of said pipe so as to correspondingly reduce the volume of the associated delivery pipe feeding another cylinder of the engine having a piston positioned at an interval of half a cycle from that of the cylinder within which is delivered the main injection.

Said reduction in volume results in a corresponding injection of fuel in said other cylinder of the engine since any return of the fuel excess to the pump cylinder is prevented by the check valve of the latter.

The results of the experiments carried out clearly show that the device according to this invention provides means for adjusting at will the amount of the "carburating" fraction, by means of a corresponding adjustment of the total volume of the two chambers. One of the most credible explanations of these results seems to be the following:

At the moment of the releasing of the injector providing the main injection, the pressure level in the corresponding delivery pipe is in fact considerably higher than that to which said injector is adjusted in view of the fact that the very rapid pressure increase due to the upward movement of the pump piston is only partly compensated by the pressure decrease resulting from the fuel discharge through the injector.

At this time the pressure in the delivery pipe destined to the igniting fraction of the fuel charge is higher than that prevailing in the other delivery pipe destined to the carburating fraction to such an extent as to force the displacement or defromation of the separating wall which is kept within a maximum limit value by means of the rigid walls of said chambers. This limitation to a maximum of the displacement or deformation of the separating wall is an essential characteristic of this invention since it permits the regulation of the amount of the carburating fraction to a substantially constant level independently from the total fuel charge.

However, it must be emphasized that the present invention is by no means limited to the previous tentative explanation since the results achieved and the conditions for carrying out this invention are independent from the theoretical scientific theory which might be adopted.

The invention is now further described more in detail with reference to the accompanying drawings, wherein FIGURE 1 is a schematic diagram of the general assembly of the interconnecting means between the injectors in the cylinders of the engine and the cylinders of the fuel pump, wherein the separating wall between the two chambers of the interconnected device according to the invention consists of a deformable membrane;

Figure 2:
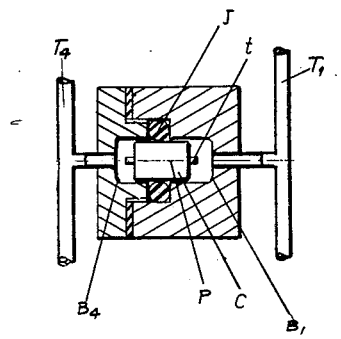
FIGURES 2 and 3 show another embodiment of the invention comprising a freely moveable piston as a separating wall between two chambers formed in a cylinder.
Figure 3:
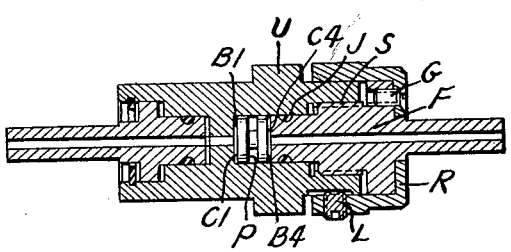
Figure 5:
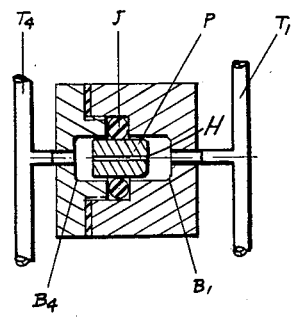
Figure 6:
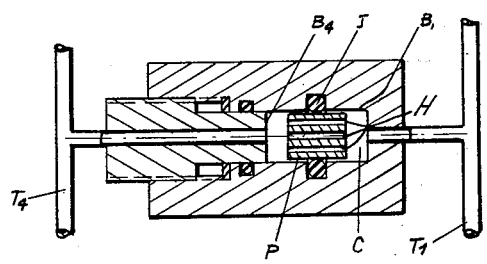
Figure 7:
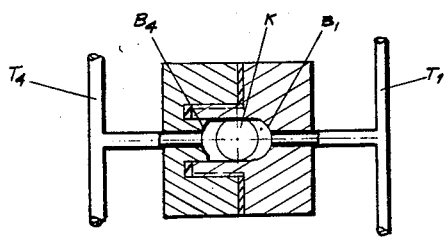

FIGURES 5 and 6 schematically represent the same devices as shown in FIGURES 2 and 3, respectively, wherein the moveable piston is further provided with an internal conduit of calibrated section, and FIGURE 7 shows a further embodiment of this invention wherein the separating wall consists of a ball.

The operating conditions of the device according to the invention will be now described with particular reference to the case of a four-stroke engine, each cylinder of which is fed by a separate delivery pipe connected to a particular cylinder of the pump, said pipes being associated by pairs so that the volume of fuel in each pipe of a pair may be varied without change of the total volume of the two pipes of said pair.

The interconnected device between the two pipes comprises two chambers $C_1$ and $C_4$ provided in two side plates $Q_1$ and $Q_4$ (FIGURE 1) which are tightened after insertion therebetween of a deformable membrane M. Each of said chambers freely communicates with the delivery pipes $T_1$ and $T_4$ of the fuel pump feeding the injectors of the cylinders 1 and 4, respectively.

At the moment when the piston $P_1$ of the pump compresses the fuel into the delivery pipe $T_1$, feeding the injector $I_1$, the fuel pressure increases in said pipe up to the moment at which said injector $I_1$ is released. Prior to this moment a residual pressure had prevailed in the pipe $T_4$, which pressure was substantially equal to that prevailing in the pipe $T_1$. However, the pressure increase occurring during compression by the piston $P_1$ of the pump provides a pressure difference between the two sides of the separating membrane which results in a resultant force displacing the latter toward the rigid wall of the chamber $C_4$, thereby compressing the fuel into the pipe $T_4$, until said membrane is blocked by said rigid wall of the chamber $C_4$. Such a displacement of the membrane provides for a pressure increase in the pipe $T_4$ so that the resulting pressure is higher than that at which the injector $I_4$ is adjusted. This provides for an injection into the hot residual gases in the cylinder 4 of the fuel amount substantially equal to the excess of the volume displaced by the membrane over that required for bringing the pressure in $T_4$ to the level at which the injector $I_4$ is adjusted. Said fuel amount is limited by the maximum stroke of the membrane M, whereas the fuel amount injected in cylinder 1 depends on the stroke of the piston $P_1$ of the pump.

At the next compression stroke of the engine, i.e. after one complete revolution of the crankshaft (four-stroke engine) corresponding to a 180° rotation of the camshaft, the piston $P_4$ of the corresponding cylinder of the injection pump feeding the cylinder 4 compresses the fuel into the delivery pipe $T_4$ feeding the injector $I_4$.

The resulting increased pressure in pipe $T_4$ pushes aside the membrane from the wall of the chamber $C_4$ toward that of the chamber $C_1$ as a result of the corresponding pressure difference between the two sides of the membrane. This displacement of the membrane compresses the fuel into the pipe $T_1$ until the required pressure for releasing the injector is attained and causes injection in the cylinder 1 of a fuel amount which is limited to a maximum value due to the blocking of the membrane by the rigid wall of the chamber $C_1$. At the moment where the injection into cylinder 1 ceases, that in cylinder 4 continues as long as piston $P_4$ still compresses the fuel in the pipe $P_4$. Thus, secondary injections are carried out alternatively through injectors $I_1$ and $I_4$ of the cylinders 1 and 4 concurrently with the corresponding main injections, at each half-cycle of the engine.

It may be seen that according to these operating conditions the volume of the carburating fraction injected into the cylinder which is associated to that cylinder wherein is carried out the main injection, is dependent on the total volume of the two chambers available for the displacement of the membrane M. The volume displacement $Vo$ by the membrane which would be necessary for raising the fuel pressure into the delivery pipe through which is carried out the secondary injection to that pressure at which the corresponding injector is released, being unchanged for a given capacity of the delivery pipes, the amount of the carburating fraction will be substantially equal to the difference between the volume V actually displaced by the membrane and said volume $Vo$.

It is therefore apparent that the volume of the carburating fraction is substantially independent from the running speed of the engine and the total charge injected per cycle as far as the amount of the igniting fraction is higher than that corresponding to said volume $V-Vo$. Otherwise, i.e. when the fuel amount destined to the main injection is lower than said volume $V-Vo$, the igniting and the carburating fractions are substantially of the same amount (i.e. of about 50% of the total charge).

The amplitude of the displacement of the membrane M, upon which the amount of the carburating fraction is dependent, may be adjusted at will by varying the volume of the chambers. This is effected by displacing the rigid walls $B_1$ and $B_4$ delimitating said chambers with respect to one another (case of FIGURES 2 and 3) or by providing said chambers with adjustable arresting means such as $V_1$ and $V_4$ (FIGURE 1A).

FIGURES 2 and 3 show another embodiment of the device according to this invention wherein the membrane is replaced by a freely movable piston P in a cylinder C, the stroke of the piston being limited by the rigid end walls $B_1$ and $B_4$ of said cylinder and the piston being provided with annular sealing means J.

This displacement of the piston P in the cylinder C, due to the difference of pressure in the pipes $T_1$ and $T_4$ respectively, tends to equilibrate said pressures to the same level in said two pipes.

The pressure in the delivery pipe, through which is to be effected the main injection, is sufficient for releasing the corresponding injector and is transmitted to the associated pipe by means of said piston to release the injector fed by said last-mentioned pipe which is adjusted to the same pressure level as that providing for the main injection. This equilibrium of pressures in the two associated pipes ceases when said piston is blocked by the rigid wall of the cylinder ($B_1$ and $B_4$) since, at this moment, the pressure in the pipe through which is effected the main injection is no longer transmitted to the associated pipe.

It may be of advantage to reduce the speed of displacement of the piston before the same is stopped by the rigid wall of the chamber so as to avoid any shock wave in the pipe, through which is effected the main injection, accompanied by an expansion wave in the associated pipe. These waves would occur as a result of an abrupt stopping in the piston movement.

Such a slowing down of the piston movement toward the end of its stroke may be achieved, for example, according to this invention by providing the end faces of the piston with cylindrical pins $t$ (FIGURE 2) of a diameter slightly lower than that of the adjacent interconnecting pipe so that said pins may penetrate into the latter with a certain play which is selected in such a manner as to result in a high loss in pressure of the fuel forced from the corresponding chamber to said interconnecting pipe.

The amount of the carburating fraction is thus equal to the difference between the total volume of fuel displaced by the piston (i.e. the difference in volume between the cylinder C and the piston P) and that part of said volume which would have to be displaced by said piston in order to bring the pressure in the delivery pipe through which is carried out the secondary injection, to that pressure level at which is adjusted the corresponding injector, each of said volumes being substantially constant for a given volume of the delivery pipes, of the cylinder and of the piston.

Consequently, the amount of the carburating fraction is substantially independent of the total charge.

However, said amount may be adjusted to the desired value by means of a corresponding adjustment of the volume of the cylinder C, which volume may be varied by displacement of the end walls of said cylinder relative to each other (displacement of the end wall $B_4$ according to FIGURES 2 and 3).

In particular, FIG. 3 illustrates the means for varying the volumes of the chambers by displacement of the walls B1 and B4. A piece F, the end of which constitutes the wall B4, is screwed onto a stationary piece U by a threading S. One can thus regulate the volume of chambers C1 and C4 including on both sides of the piston P by regulating the screwing of the piece F on the threading S. Once this adjustment is effected, the piece F can be blocked by means of a blocking screw L which holds the piece F in position, the latter being united with a piece R, for example, by means of a screw G. The annular sealing means J are also provided between the threading and the chambers so as to prevent any escaping of fuel.

Such an adjustment provides means for varying the amount of the carburating fraction in relation to the type of fuel used so that said amount be always kept to an optimum value with respect to the amount of the igniting fraction.

Moreover, said adjustment also provides means for varying at will the operating method of the engine by changing from the double-injection system either to the single-injection system of the conventional type (which is achievable by blocking the piston between the end walls of the cylinder or the membrane by means of the arresting devices) or to a modified single-injection system providing for modification in the variations of the pressure and/or the discharge rate at the output of the injector.

Such a modified injection system may be achieved according to this invention by adjusting the stroke of the piston of the interconnected device so that the pressure changes in the pipe associated to that one through which is delivered the fuel destined to the main injection is insufficient for releasing the corresponding injector. In this way no secondary injection is effected and the interconnected device according to this invention merely acts as a variable capacity of the pipe through which the fuel destined to the main injection is delivered to the corresponding injector, which provides means for improving the diagram of the discharge rate of the injector during the injection period.

Figure 1:
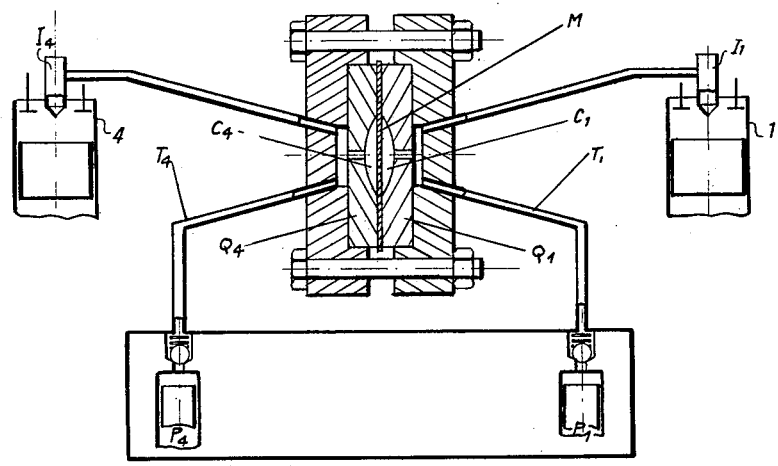
FIGURE 1A is a view of a similar embodiment of the device according to the present invention, wherein the deformation of the membrane used as separating wall between the two chambers is limited to a maximum which may be adjusted at will.
Figure 1A:
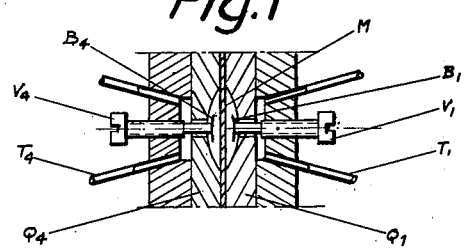

All of the devices shown in FIGURES 1 to 3 offer a further advantage in that, in the case of misfunctioning of an injector (for instance if said injector is not released at all) any excessive discharge of fuel from the other injector fed through the associated delivery pipe is avoided, which excess of fuel may be as high as that corresponding to the normal discharge of the injector and may produce a highly detrimental thermal effect in the cylinder.

Figure 4:
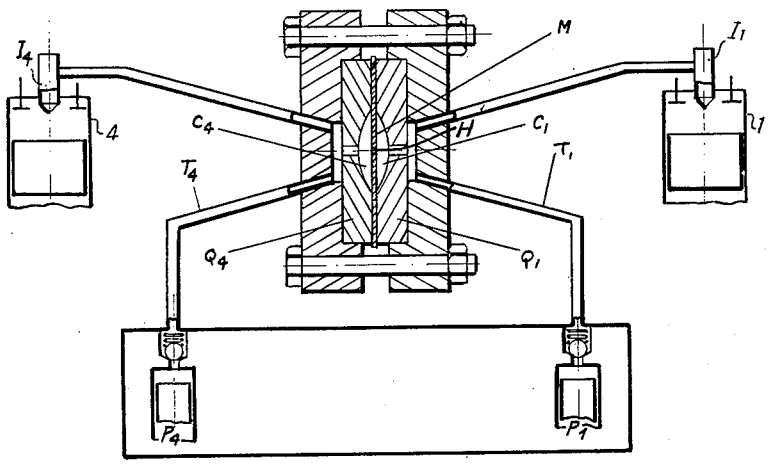
FIGURE 4 shows a schematic diagram similar to that of FIGURE 1 except that the membrane is provided with a calibrated hole.

However, if it is desired to vary the amount of the carburating fraction in relation to the amount of the total charge, such a result can be achieved by any of the devices shown in FIGURES 4 to 6; which are derived from the preceding ones by further providing the separating wall of the two chambers with a calibrated hole H (a plurality of holes H in the embodiment shown in FIG. 6) through which part of the fuel may pass from one delivery pipe to the other.

Such a direct communication between the two pipes leads to amounts of the carburating fraction which are substantially proportional to the total charge whereas the effect of the movable separating wall in association with an arresting device for the membrane or stroke-limiting means for the piston is to maintain the amount of the carburating fraction substantially independent from the total charge.

Therefore, the combination of the two systems by use of a moveable wall having a calibrated hole H, may provide means for adjusting the amount of the carburating fraction partly in relation to the total amount of the fuel charge and partly independently from the latter. This combination may be of advantage where it is desired that the amount of the carburating fraction be always higher than a minimum given value. It may also be of interest to provide the moveable separating wall with a plurality of small calibrated holes H so as to obtain a turbulent flow of fuel under certain operating conditions (FIG. 6). Accordingly, the discharge rate of the fuel may be varied in relation to such parameters as the fuel charge and the running speed of the engine.

Still another device, shown in FIGURE 7 may also be advantageously used for this purpose. It corresponds to that already shown in FIGURES 2 and 3 wherein the piston P is replaced by a ball B moveable in a chamber K which differs from a cylinder in that its end walls ($B_1$ and $B_4$) have the shape of a spherical calotte and may be displaced from one another.

The action of the ball is different from that of the piston in the devices shown in FIGURES 2 and 3 and similar to a certain extent to that of a piston provided with one or more calibrated holes as exemplified by FIGURES 5 and 6, since it is not provided with sealing means and a certain amount of fuel may pass between the ball and the internal wall of the chamber K.

In such a case the amount of the carburating fraction may vary to a certain extent in relation with the total charge.

The following examples, which are not to be considered as limitative in any way, illustrate the use of a device according to the invention of the type diagrammatically shown in FIGURE 3, the piston P of which has a diameter of 9 millimeters.

This device is adapted to the delivery pipes of an injection pump having four cylinders provided with resuction valves and used for operating a compression ignition engine of the diesel type having four cylinders of a total capacity of 2.7 liters and provided with prechambers. The resuction valves prevent the return of the fuel from the pipes to the pump, only after the piston of the latter has started to descend while sucking in a very small part of the fuel which is, however, sufficient to ensure decompression in the pipes. Such resuction valves ensure the sudden closing of the injector by causing the pressure to the fuel in the pipes to fall rapidly.

A first set of tests has been carried out at a constant running speed (1,500 revolutions per minute of the camshaft of the pump) so that the amount of fuel (gas oil) delivered at the output of the pump per time unit will be maintained substantially constant.

The results summarized in the following table show that the amount of the carburating fraction may be easily adjusted to the desired value by varying the stroke of the piston P.

*Table I*

| Serial No. of the test | Stroke of the piston (mm.) | Amount of fuel injected per cycle (mg.) | | | Share of the carburating fraction (percent of total charge) |
|---|---|---|---|---|---|
| | | Igniting injection | Carburating injection | Total injection | |
| 1 | 0.3 | 25.4 | 0.6 | 26 | 2.3 |
| 2 | 0.4 | 22.4 | 2.3 | 24.7 | 9.3 |
| 3 | 0.5 | 19.3 | 7.4 | 26.7 | 27.8 |
| 4 | 0.7 | 16.3 | 9.0 | 25.3 | 35.6 |
| 5 | 0.9 | 15.6 | 9.8 | 25.4 | 38.6 |
| 6 | 1.0 | 15.5 | 10.0 | 25.5 | 39.2 |
| 7 | 1.1 | 15.4 | 10.3 | 25.7 | 40.0 |
| 8 | 1.3 | 15.3 | 10.6 | 25.9 | 41.0 |
| 9 | 1.5 | 15.2 | 11.0 | 26.2 | 42.0 |
| 10 | 2.0 | 15.1 | 11.2 | 26.3 | 42.6 |

A second set of tests shows that the amount of the carburating fraction may be kept substantially unchanged while varying within a wide range the amount of the igniting fraction.

These tests have been carried out by using a device the piston of which has a diameter of 9 millimeters and a maximum stroke of 0.44 millimeter in association with the same pump as that used in the preceding tests, the camshaft of which was maintained at a speed of 1,500 revolutions per minute.

The results, as given in the following table, show that the carburating fraction may be adjusted to a very low amount which has not to be increased in proportion with the total fuel charge.

*Table II*

| Serial number of the test | Fuel amount injected per cycle (mg.) | | |
|---|---|---|---|
| | Total | Igniting injection | Carburating injection |
| 11 | 13 | 11.5 | 1.5 |
| 12 | 20 | 18.0 | 2.0 |
| 13 | 28 | 27.0 | 1.0 |
| 14 | 38 | 37.0 | 1.0 |

Further tests have been carried out, the results of which, given hereinafter, show that the amount of the carburating fraction per cycle is substantially independent of the running speed of the engine.

*Table III*

| Serial No. of the test | Speed of the pump (no. of revolutions per minute) | Fuel amount injected per cycle (mg.) | | |
|---|---|---|---|---|
| | | Total | Igniting | Carburating fraction |
| 15 | 500 | 12.9 | 11.7 | 1.2 |
| 16 | 1,000 | 13.0 | 12.0 | 1.0 |
| 17 | 1,500 | 12.8 | 11.7 | 1.1 |

It will be understood that, while there have been given herein certain specific examples of the apparatus and use of this invention, it is not intended thereby to have this invention limited to the specific details of materials, proportions or conditions herein specified, in view of the fact that this invention may be modified according to individual preference or conditions without necessarily departing from the spirit of this disclosure and the scope of the appended claims.

It will be understood that this invention is susceptible to modifications in order to adapt it to different usages and conditions and, accordingly, it is desired to comprehend such modifications within this invention as may fall within the scope of the appended claims.

What I claim is:

1. In an internal combustion engine of the compression ignition type having an injection pump with an even number of delivery lines leading from the pump to the cylinders of the engine, a double-injection device comprising a body connected between a pair of delivery lines which are fed by a pump at intervals of time corresponding to a half cycle of the engine, there being a cylinder within said body between the inner walls thereof, a freely moveable piston in said cylinder having its stroke limited by the end faces thereof, said piston defining a pair of chambers therein, means for establishing free communication between each chamber of a pair thereof and one of the pair of said delivery lines, and means for slowing down the movement of the piston toward the ends of its stroke.

2. In an internal combustion engine of the compression ignition type having an injection pump with an even number of delivery lines leading from the pump to the cylinders of the engine, a double-injection device comprising a body connected between a pair of delivery lines which are fed by a pump at intervals of a half cycle of the engine, a pair of separate chambers in said body freely communicating with the delivery lines respectively, and a partition wall at least partially moveable between said two chambers and provided with at least one hole of calibrated section through which the chambers of said pair are connected to each other.

3. In an internal combustion engine of the compression ignition type having an injection pump with an even number of delivery lines leading from the pump to the cylinders of the engine, a double-injection device comprising a body connected between a pair of delivery lines which are fed by a pump at intervals of time corresponding to a half cycle of the engine, means within said body forming a pair of chambers therein, a deformable membrane separating said pair of chambers, there being a hole of a predetermined size in said membrane so as to provide communication between said chambers of said pair, and means for connecting each of said pair of chambers to a separate one of said pair of delivery lines.

4. In an internal combustion engine of the compression ignition type having an injection pump with an even number of delivery lines leading from the pump to the cylinders of the engine, a double-injection device comprising a body connected between a pair of delivery lines which are fed by a pump at intervals of time corresponding to a half cycle of the engine, means within said body defining a cylinder therein, a freely moveable piston within said cylinder so as to define a pair of chambers within said cylinder, there being an opening of a predetermined size in said piston for providing communication between the chambers within said cylinder, and means for establishing free communication between each chamber within said cylinder and a separate one of said pair of delivery lines.

5. In an internal combustion engine of the compression ignition type having an injection pump with an even number of delivery lines leading from the pump to the cylinders of the engine, a double-injection device comprising a body connected between a pair of delivery lines which are fed by a pump at intervals of a half cycle of the engine, a pair of separate chambers in said body freely communicating with the delivery lines respectively, and a partition wall at least partially moveable between said two chambers, said partition wall providing for an imperfect sealing between the chambers of said pair.

6. In an internal combustion engine of the compression ignition type having an injection pump with an even number of delivery lines leading from the pump to the cylinders of the engine, a double-injection device comprising a body connected between a pair of delivery lines which are fed by a pump at intervals of time corresponding to a half cycle of the engine, means within said body defining a cylinder therein, a freely moveable ball within said cylinder and forming a pair of chambers at both ends of the cylinder, there being a space between said ball and the walls of said cylinder so that said wall provides an imperfect seal between the chambers of said pair, and means for establishing a free communication between each chamber of said pair and a separate one of said two delivery lines.

References Cited in the file of this patent

UNITED STATES PATENTS

| | | |
|---|---|---|
| 2,110,405 | Starr | Mar. 8, 1938 |
| 2,933,073 | Knudsen | Apr. 19, 1960 |

FOREIGN PATENTS

| | | |
|---|---|---|
| 1,140,477 | France | Mar. 4, 1957 |